Figure 1:
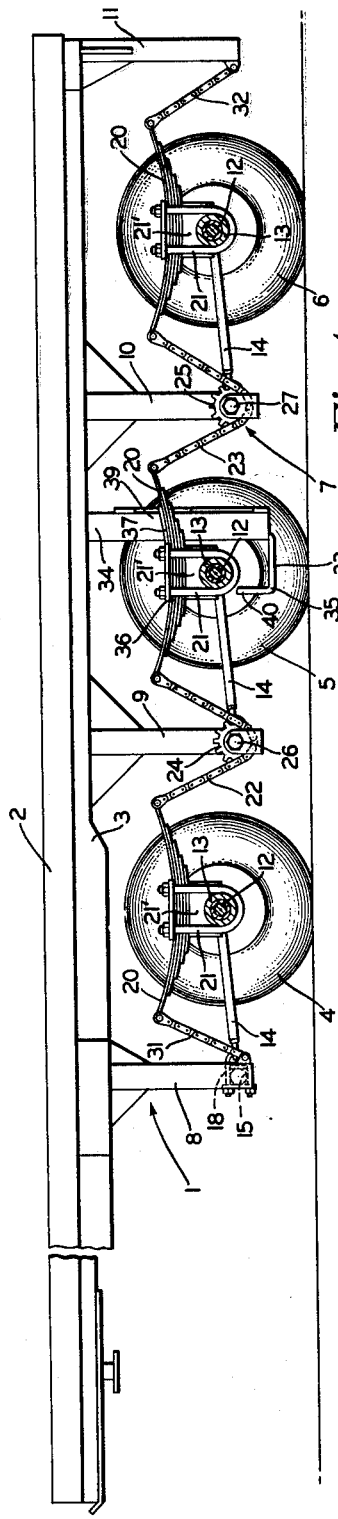

May 26, 1964 — O. I. OYLER — 3,134,606

TRAILER CONSTRUCTION

Filed May 2, 1962 — 2 Sheets-Sheet 1

INVENTOR.
Otto I. Oyler
BY
Frease, Bishop, Johns & Schick
ATTORNEYS

May 26, 1964
O. I. OYLER
3,134,606
TRAILER CONSTRUCTION
Filed May 2, 1962
2 Sheets-Sheet 2
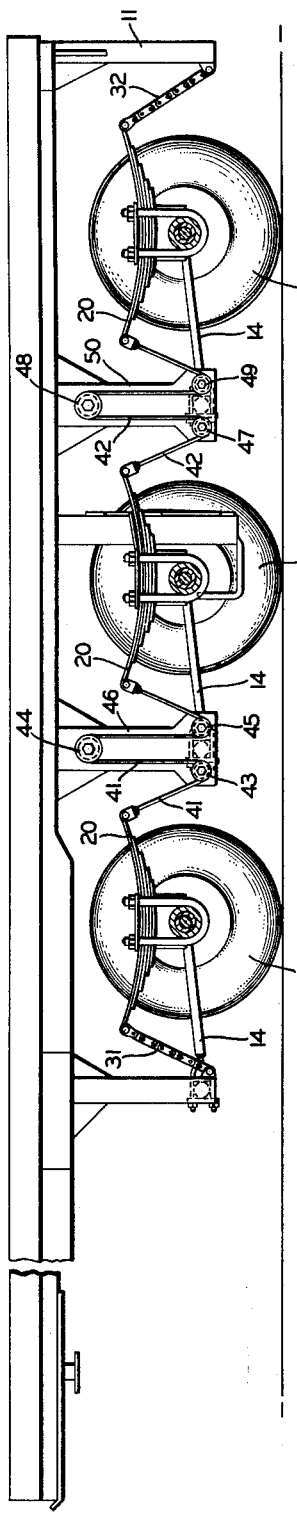
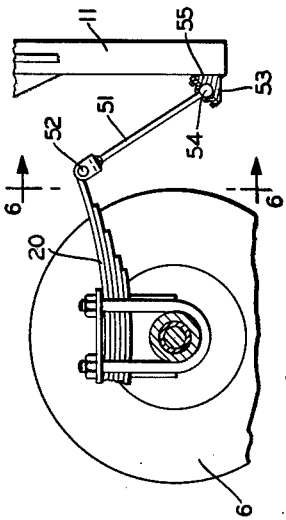
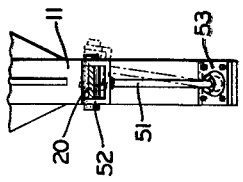
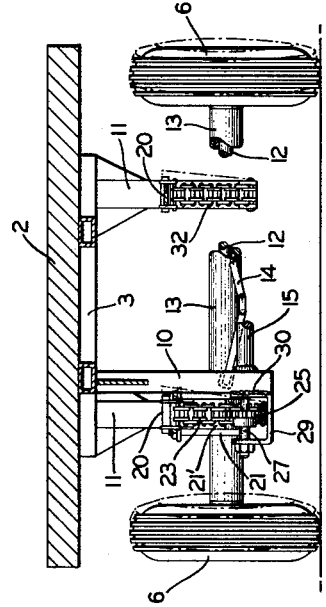
INVENTOR.
Otto I. Oyler
BY
Frease, Bishop, Johns & Schick
ATTORNEYS

# United States Patent Office 3,134,606
Patented May 26, 1964

3,134,606
TRAILER CONSTRUCTION
Otto I. Oyler, 1208 Waynesburg Road, Canton, Ohio
Filed May 2, 1962, Ser. No. 191,943
1 Claim. (Cl. 280—104.5)

This invention relates to a trailer construction and more particularly it pertains to a stabilizing device for a trailer type vehicle.

Due to the increasing cost of operating and maintaining trailer type vehicles they have been adapted for carrying heavier loads. Various means have been used for increasing the percentage of a pay load weight, such as by increasing the number of axles in order to conform with the axle load limits as established by law.

By spreading or increasing the spacing of axles the pay load is distributed over a greater portion of a road bed. Such efforts have not been completely satisfactory, however, for several reasons. It has been found that the spreading of two or more axles on a trailer increases the wear on tires and requires more fuel due to the greater difficulty in pulling the trailer. Most of the earlier prototypes of the larger trailers having three axles were non-turning axles which were not only difficult to drive over a curved highway but created tremendous binding stresses on the trailer frame that often resulted in cracking of the frame.

Various attempts have been made to correct that difficulty by providing trailers having turning axles. Such construction has substantially cured the problem of trailer frame cracking. However, some types of turning axles have created other difficulties for which reason they have not been widely accepted. For example, a multiple rear axle assembly of the type disclosed in Patent No. 2,296,681, issued September 22, 1942, provides a slide plate unit in which a plate fixed to the trailer frame is in sliding contact with a laterally movable plate connected to a laterally movable axle. That construction was never widely accepted in conjunction with trailers having chains connecting the ends of springs for adjacent axles, because the sliding plates would "freeze" in place due to the accumulation of road dirt, salt, sand, and the weight of the loaded trailer. It was found that the plates would slide with respect to each other only when the opposing forces between the axles and the trailer frame were great enough, in which event the sliding would be sudden and extensive instead of gradual and limited and thereby resulted in the entire loaded trailer rocking, and upsetting in extreme cases.

Associated with the foregoing problem is the problem of excessive wear and tear on tires and excessive gasoline consumption. It has been found that the foregoing problems may be overcome by providing multiple rear axle units having interconnecting chains with a connecting link for the connection of the rear end of the rear axle spring and the front end of the front axle spring.

By substituting the connecting link for the sliding plate unit, the foregoing difficulties are overcome because the multiple axle units are free to turn gradually as a trailer is driven over a curved road. As a result, the loaded trailer turns gradually with respect to the supporting axle units and the entire unit returns to its position of normal alignment gradually when the trailer returns to a straight road.

Generally it is an object of this invention to provide a trailer construction having multiple rear axle assemblies which rotate in conformity with the line of travel of the vehicle.

It is another object of this invention to provide a trailer construction having multiple rear axle units with interconnecting side chains and having connecting link means for controlling lateral movement of the front and rear axle units.

It is another object of this invention to provide a trailer construction having multiple rear axle units which are free to respond to rotating forces created in the axle units in response to turning of the trailer vehicle over varying directions of travel.

It is another object of this invention to provide a trailer construction having multiple rear axle units which are provided with stabilizing link means for enabling gradual turning of the separate axle units in response to the forces incurred by the moving trailer vehicle as it travels over a highway.

It is another object of this invention to provide a trailer construction having multiple rear axle units rotatably mounted and having link attachments for gradually returning the units to straight line travel.

Finally, it is an object of this invention to provide a trailer construction which accomplishes the foregoing desiderata and solves the prior art problems in a highly effective manner.

These and other objects and advantages, apparent to those skilled in the art from the following description and claims, may be obtained, the stated results achieved, and the described difficulties overcome, by the apparatus, constructions, arrangements, combinations, subcombinations, elements, parts, and principles, which comprise the present invention, the nature of which is set forth in the foregoing general statements, preferred embodiments of which—illustrative of the best modes in which applicant has contemplated applying the principles—are set forth in the following description and shown in the drawings, and which are particularly and distinctly pointed out and set forth in the appended claim forming part hereof.

Generally, the improved trailer construction of the present invention may be stated as including a longitudinal frame having four longitudinally spaced pairs of transversely spaced frame members extending downwardly from the frame, a tandem wheel unit mounted between each adjacent pair of frame members and including an axle and pairs of transversely spaced leaf springs, the ends of springs of the adjacent tandem wheel units being interconnected by wheel support means including chains extending between the ends of said springs and including a chain-receiving sprocket rotatably mounted at the lower end of the corresponding frame member, the wheel support means for the forward and rear tandem wheel units also including an elongated chain having one end pivotally attached to the end of the spring and having the other end pivotally attached to the lower end of the corresponding frame member, the wheel support means also including an axle-receiving cradle adapted to receive the axle of the center tandem wheel unit when it drops below normal operating position, and the cradle including vertical portions on front and rear sides of the axle for limiting the degree of rotation of the center tandem wheel unit.

Figure 2:
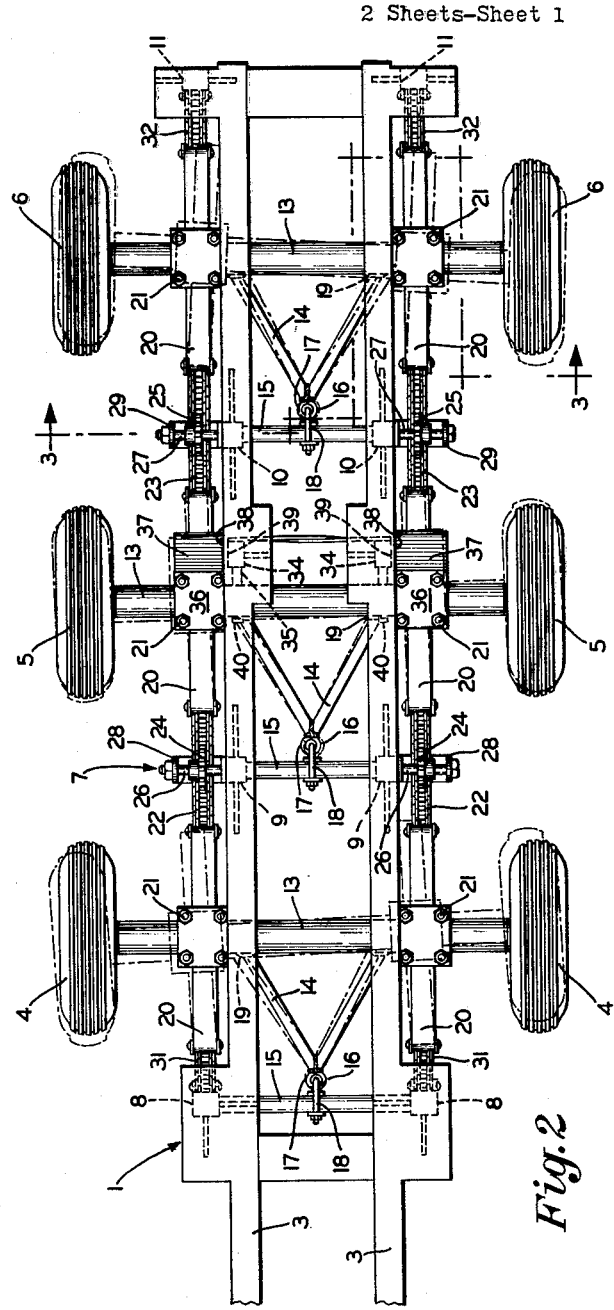

In the drawings, in which similar numerals refer to similar parts throughout the several views thereof:
FIGURE 1 is a vertical sectional view, partly in elevation, showing a tandem type trailer vehicle;
FIG. 2 is a bottom plan view of the vehicle without the trailer bed;
FIG. 3 is a vertical sectional view taken on the line 3—3 of FIG. 2;
FIG. 4 is a vertical sectional view, partly in elevation, of another embodiment of the invention;
FIG. 5 is an enlarged sectional view of the rear portion of a tandem showing a third embodiment of the invention; and
FIG. 6 is a vertical sectional view, taken on the line 6—6 of FIG. 5.

The tandem type trailer construction is generally indicated at 1 in FIG. 1. It includes a trailer bed 2, a frame 3, three pairs of tandem wheels 4, 5, and 6, and support means for the wheels generally indicated at 7. The frame 3 includes vertical frame members 8, 9, 10, and 11 which are rigidly secured at longitudinally spaced intervals to the undersurface of the frame 3 and which support the trailer bed 2 on the wheels 4–6.

Each pair of tandem wheels 4, 5, and 6 is mounted on an axle 12 within an axle housing 13 which are pivotally connected to corresponding vertical members 8, 9, and 10 by similar V-shaped radius rods 14 as shown in FIG. 2. The forward or apex end of the radius rods 14 are pivotally mounted to similar transverse members 15 and 16, which members extend between spaced pairs of the vertical members 8, 9, and 10. The pivot 16 includes a circular eye 17 connected to a U-bolt 18 secured to the transverse member 15. The radius rods 14, the spaced ends of which are connected by welds 19 to the corresponding housing 13 (FIG. 2), facilitate the turning of the tandem wheels 4, 5, and 6 in a conventional manner.

Each axle housing 13 is attached to a pair of spaced longitudinal leaf springs 20 by U-bolt means 21 and a cradle block 21'.

The support means 7 for the tandem wheels 4, 5, and 6 includes a pair of chains 22 and 23 between the tandem wheels 4 and 5 and 5 and 6, respectively. Each pair of chains 22 extends under and around a sprocket 24. Likewise, each pair of chains 23 extends under and around similar sprockets 25. As shown in FIGS. 1, 2, and 3, the end of each chain 22 and 23 is secured to extremities of spaced springs 20 for each adjacent tandem. Each sprocket 24 and 25 is rotatably mounted on a shaft 26 and 27, respectively, which extends between the upright portions of a U-bracket 28 and 29, which are secured to the outer sides of the vertical members 9 and 10, such as by weld 30 (FIG. 3).

The length of the shafts 26 and 27 is greater than the width of each corresponding sprocket 24 and 25 to permit the sprocket to slide longitudinally of the shaft.

As shown in FIGS. 1, 2, and 3, the front ends of the forward pair of springs 20 are connected to the lower end of the vertical members 8 by a pair of elongated members or chains 31. Likewise, the rear end of the back pair of springs 20 is secured to the lower end of the pair of vertical members 11 by elongated members or chains 32.

By providing the pairs of chains 31 and 32 at front and rear ends of the tandem wheels, the wheels 4, 5, 6 are free to turn gradually in response to turning forces induced in the trailer during its travel over and around a curved road. The chains 31 and 32 provide limited movement of the wheels and particularly wheels 4 and 6 between the solid and broken line positions of FIGS. 2 and 3. In a short turning radius the front and rear pairs of tandem wheels 4 and 6 turn only slightly about their respective pivots 16. As a result, the forward ends of the front pair of springs 20 are free to swing in response to the turning forces primarily directed from the front end of the trailer as it follows a cab around the curved portion of a road. During the turning the sprockets 24 and 25 move transversely of the trailer along the shafts 26 and 27, respectively. The tandem wheels 6, being mounted on the rear pair of chains 32, are similarly actuated by the same turning forces which induce the rear ends of the rear axles 20 to swing temporarily out of alignment with the other axles.

The advantage of the chains 31 and 32 is that they permit gradual movement of each pair of tandem wheels about its pivot 16. Each pair of chains 31 and 32 extends between the end of the springs and the lower end of the frame members 8 and 11. As a result, the chains 31 and 32 serve to control the extent of turning without limiting the gradual manner in which they turn.

Where the wheels 4, 5, 6 pass over an uneven road surface, the chains 22 and 23 roll around their respective sprockets 24 and 25 on the shafts 26 and 27. Rotation of the sprockets 24 and 25, together with their movement longitudinally on their shafts, cooperates with the sway of the chains 31 and 32 to result in a more normal operation between the several spaced tandem wheels 4, 5, 6.

In addition to the support means 7 for the tandem wheels 4, 5, 6, the center pair of tandem wheels 5 are provided with a pair of axle-receiving cradles 33 which include a pair of transversely spaced vertical supports 34 as well as L-shaped cradle bars 35 that extend from the lower ends of the supports 34. The bars 35 are positioned directly below the axle housing 13 of the center tandem wheels 5 and thereby limit the downward thrust of the entire center tandem assembly. Further movement of the chains 22 and 23 is provided by yielding of the center springs 20 where necessary.

As shown in FIG. 2, the vertical supports 34 are provided between the pairs of springs 20 at locations preferably directly behind the welds 19 between the radius rods 14 and the axle housing 13. As a result, the vertical supports 34 serve as limits of movement for the center tandem wheels 5 and thereby reduce the degree of turning of said tandem wheels with respect to the tandem wheels 4 and 6. In short, the proximity of the vertical supports 34 constitutes immovable objects which limit the degree of turning of the center tandem wheels 5. For that purpose the U-bolt means 21 for the tandem wheels 5 include a bolt plate 36 above each spring 20, which plate 36 includes an inclined rear portion 37 (FIG. 1). When the tandem wheel 5 turns about its pivot 16, an edge 38 of each plate portion 37 contacts one side 39 of one vertical support 34 and thereby prevents the center tandem wheels 5 from rotating beyond a limited angle of rotation. Continued travel of the trailer 1 around a curved road, however, does not prevent the sprockets 24 and 25 from shifting to accommodate further turning of the front and rear tandem wheels 4 and 6 as permitted by the front and rear pairs of chains 31 and 32.

The tandem wheels 5 are further limited from turning when the axle housing 13 drops into the L-shaped cradle bar 35. The upturned portion 40 of the bar bears against the front side of the axle housing 13 to hold the wheels 5 in alignment when the axle housing is lower than its normal position as shown in FIG. 1.

Another embodiment of the invention is shown in FIG. 4 in which pairs of cables 41 and 42 are provided instead of chains 22 and 23. The cable 41 having its extremities connected to ends of pairs of springs 20 extends over and around spaced pulleys 43, 44, and 45 which are mounted on one side of a vertical frame member 46. Likewise, the cable 42 extends over and around spaced pulleys 47, 48, and 49 which are similarly rotatably mounted on one side of a vertical frame member 50. The cables 41 and 42 and their pulleys operate in a manner substantially similar to the chains 22 and 23 and their corresponding sprockets.

Another embodiment of the invention is shown in FIGS. 5 and 6 in which a pair of connecting links 51 are provided at front and rear ends of the tandem wheels instead of the pairs of chains 31 and 32. As shown in FIGS. 5 and 6, the upper end of each link 51 is pivotally connected to the extremity of the spring 20 at 52. The lower end is secured to the lower end of the vertical frame member 11 in a ball and socket joint 53 in which the link preferably includes the ball portion 54 and the socket portion 55 is mounted on the frame member 11. The links 51 operate in a manner similar to the chains 31 and 32 in which they are free to turn in response to forces acting upon the tandem wheels 6 from the vertical solid line position of FIG. 6 to either side, as shown by the broken line position.

The device of the present invention provides an improvement over prior constructions of trailers having tandem wheel units with chain connections therebetween. By providing additional means for anchoring the front and rear ends of the springs for the front and rear tandem wheels, the entire assembly is adapted to move more freely and gradually in response to turning forces induced in the trailer as it travels around a curved portion of a road. As a result, the chains or cables or connecting links which secure the springs in place provide the tandem wheels with an easily maneuverable assembly.

In addition, the support means for the tandem wheels includes vertical support means for supporting and limiting the degree of sagging and turning of the central tandem wheels which result in a greater degree of turning of the front and rear tandem wheels and which thereby result in a greater advantage in operation of the trailer including economies in gasoline consumption, tire wear, and reduced turning stresses on the trailer frame.

In the foregoing description certain terms have been used for brevity, clearness and understanding, but no unnecessary limitations have been implied therefrom as such words are used for descriptive purposes and are intended to be broadly construed.

Moreover, the embodiment of the improved construction illustrated and described herein is by way of example and the scope of the present invention is not limited to the exact construction shown.

Having now described the invention, construction, operation and use of a preferred embodiment thereof and the advantageous, new and useful results obtained thereby; the new and useful trailer construction and reasonable mechanical equivalents thereof obvious to those skilled in the art are set forth in the appended claim.

What is claimed is:

In a trailer construction having a longitudinal frame with four longitudinally spaced pairs of transversely spaced vertical frame members depending from the frame, having a tandem wheel unit mounted between adjacent pairs of frame members and including an axle and a pair of transversely spaced longitudinally extending leaf springs, having the adjacent spring ends of the adjacent tandem wheel units being interconnected by chains extending over chain-receiving sprockets rotatably mounted at the lower end of the adjacent vertical frame members, and having chains extending between each end of the forward tandem wheel unit and the adjacent vertical frame members and between each end of the rear tandem wheel unit and the adjacent vertical frame members, the improvement comprising wheel-support means also including a transverse member extending between the lower ends of transversely spaced pairs of vertical frame members and including a V-shaped radius rod having the forward apex pivotally attached to the transverse member and having rear end portions attached to the axle of the adjacent tandem wheel unit, the tandem wheel units being pivotally movable about the apex of the radius rods, the axles of each tandem wheel unit being vertically movable between upper and lower vertical positions when travelling over a road surface, a pair of vertical supports extending from the frame and located behind the center tandem wheel unit, an axle-receiving cradle attached to the lower end of each vertical support and having a rigid horizontal portion extending under the axle, and said cradle having an upturned rigid end portion the upper end of which is below a normal riding position of said axle and which is positioned longitudinally ahead of said axle, whereby the cradle limits the downward thrust of the center tandem wheel unit when travelling over a rough road bed and whereby the upturned end portion of the cradle does not normally interfere with the horizontal pivotal movement of the center tandem wheel unit.

References Cited in the file of this patent

UNITED STATES PATENTS

| 1,436,031 | Furlong | Nov. 21, 1922 |
| 2,128,806 | Dwork | Aug. 30, 1938 |
| 2,250,019 | Heinmiller | July 22, 1941 |
| 2,269,728 | Mills | Jan. 13, 1942 |
| 2,823,926 | Stover | Feb. 18, 1958 |

FOREIGN PATENTS

| 66,282 | Denmark | Feb. 2, 1948 |